United States Patent [19]
Mayer

[11] 3,842,533
[45] Oct. 22, 1974

[54] POTTING AND REPOTTING MACHINE

[76] Inventor: Georg Mayer, Bahnhofstrasse 60, Heidenheim-Mergelstetten, Germany

[22] Filed: Jan. 10, 1974

[21] Appl. No.: 432,164

[30] Foreign Application Priority Data
July 28, 1970 Germany.................... 2037408.7

Related U.S. Application Data
[63] Continuation of Ser. No. 371,656, June 19, 1973, abandoned.

[52] U.S. Cl. ..................................... 47/1, 221/298
[51] Int. Cl. .............................................. A01g 1/04
[58] Field of Search .......... 47/1, 37.6; 221/251, 298

[56] References Cited
UNITED STATES PATENTS

| | | | |
|---|---|---|---|
| 1,210,520 | 1/1917 | Oliver | 221/298 X |
| 2,721,684 | 10/1955 | Heinl et al. | 221/298 X |
| 2,826,003 | 3/1958 | Oki et al. | 47/37.6 X |
| 2,870,937 | 1/1959 | Telly | 221/298 X |
| 2,946,480 | 7/1960 | Farber | 221/251 X |
| 2,974,828 | 3/1961 | Matteson | 221/298 X |
| 3,057,515 | 10/1962 | Loeser | 221/298 X |
| 3,657,839 | 4/1972 | Krause | 47/1 |

Primary Examiner—Robert E. Pulfrey
Assistant Examiner—Edward M. Coven
Attorney, Agent, or Firm—Woodhams, Blanchard and Flynn

[57] ABSTRACT

A potting and repotting machine having a conveying mechanism for flower pots, and an automatic pot-delivery device with at least one support device for a vertical stack of pots. The pot delivery device has a dispensing device for placing one pot each from the stack onto the pot conveying mechanism, which dispensing device is arranged above the conveying mechanism. At least two holders are provided which can be moved alternately in operative position, the first holder of which grips in operative position under the edge of the lowermost pot and the second holder of which clampingly abuts in operative position the next lowest pot in the zone of its edge.

20 Claims, 6 Drawing Figures

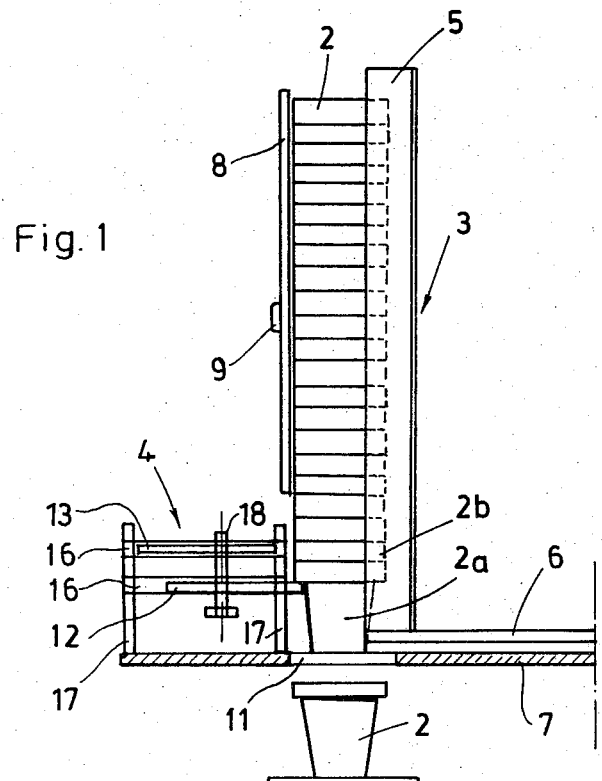
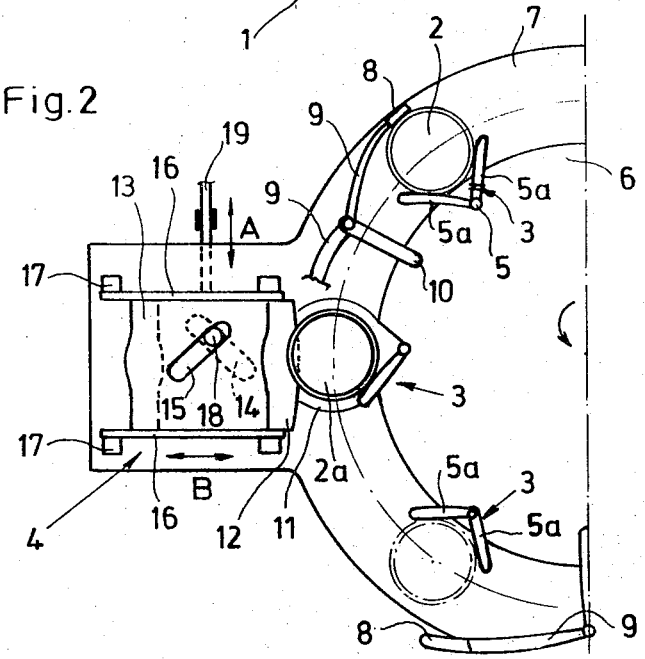

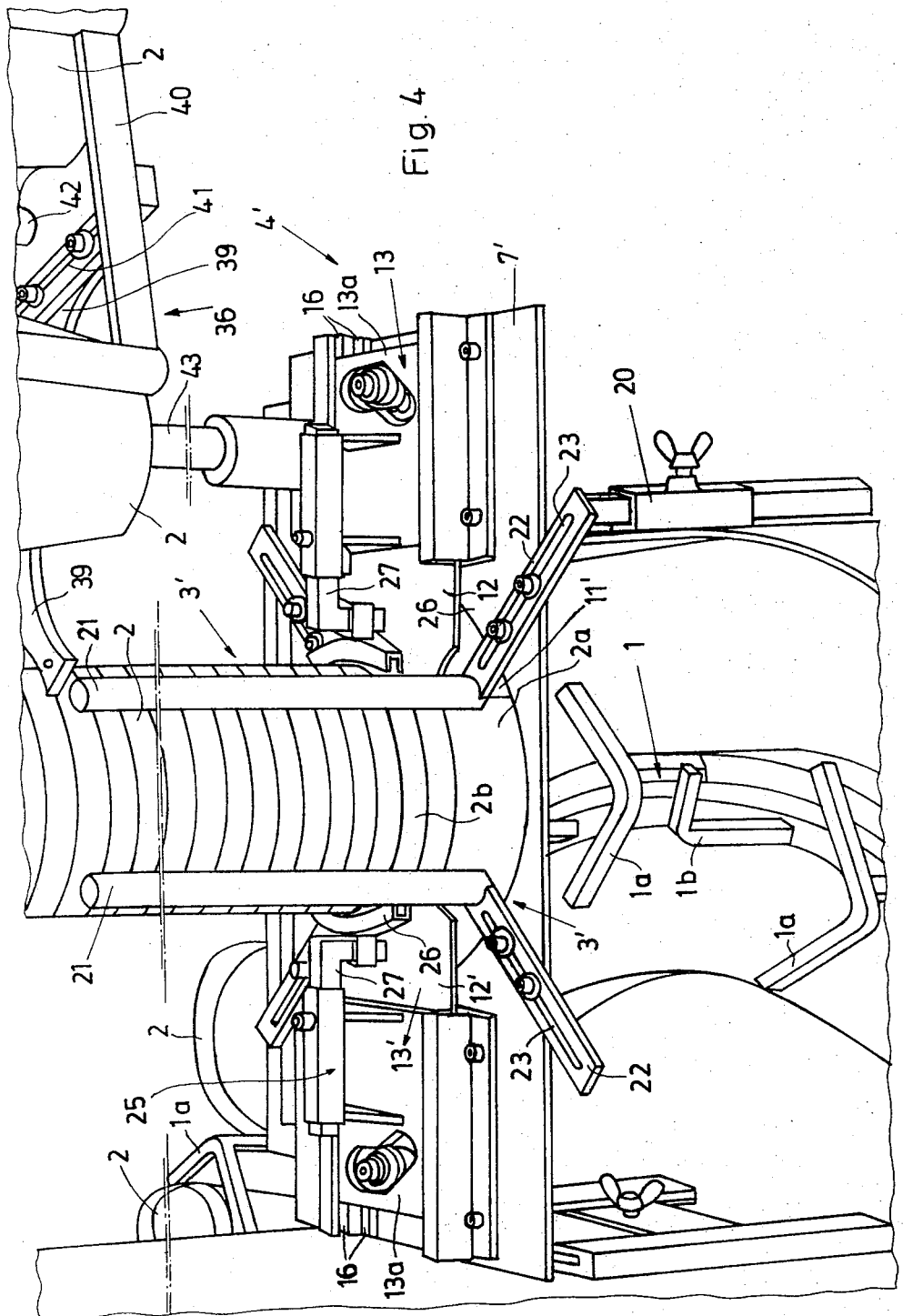

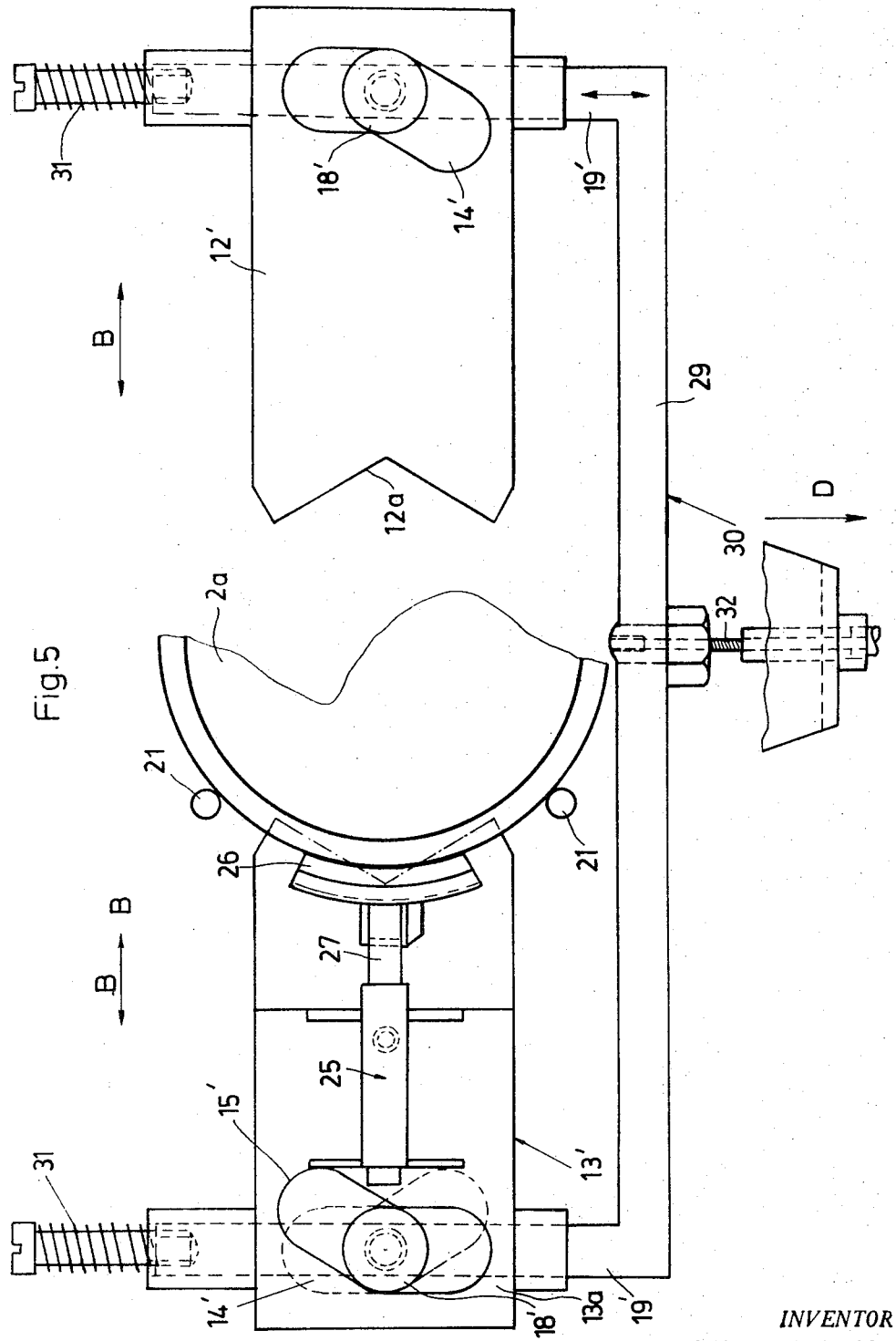

POTTING AND REPOTTING MACHINE

This is a continuation, of application Ser. No. 371 656, filed June 19, 1973, now abandoned.

The invention relates to a potting and repotting machine with a conveying mechanism for flower pots.

In such a machine the conveying mechanism conducts the flower pots from one station to another, for example to a filling station, which feeds soil to the flower pots, thence to a drilling device where a hole is drilled into the soil which has been deposited into the flower pot, and finally to an insertion point where a plant is inserted manually into the pot. The filling and drilling device together with the conveying mechanism can easily operate automatically. An effective operation is, however, only possible when the conveying mechanism receives the flower pots equally spaced apart and without interruptions. Such an equal spacing of the flower pots by hand is, however, monotonous, strenous and requires constant attention. Thus, it is very uneconomic particularly because the person placing the flower pots must receive the supply of such pots from further personnel.

The purpose of the invention is to produce a potting and repotting machine of the above-described type in which the flower pots can be fed evenly, and at intervals adjustable to the working capacity of the machine, to the conveying mechanism and at which an ample and easily refillable supply of pots can be stored.

To attain this purpose, the inventive potting and repotting machine is characterized by an automatic pot-delivery device with at least one support device for a vertical stack of pots with a dispensing device for placing one pot each from the stack onto the pot conveying mechanism, which dispensing device is arranged above the conveying mechanism and has at least two holders which can be moved alternately into operative position, the first holder of which grips under the edge of the lowermost pot and the second holder of which clampingly abuts the next lowest pot in its edge zone.

A vertically arranged stack of pots has several advantages. The pot to be set down slides downwardly by its own weight when the holder is withdrawn. Practically no friction is created with the support device. Breakdowns due to clamping of the pots or damage to the pots are avoided in this manner. A stack of pots which is arranged vertically requires little horizontal space and there is room available for supply stacks in the immediate vicinity of the insertion device.

The operation of the alternately activated holders can be adjusted in a simple manner to the working capacity of the machine. The movements of the two holders are very simple since both in the case of the first holder which must be moved under the pot edge or withdrawn therefrom, and also in the case of the second holder which must be pressed clampingly against a pot edge and withdrawn therefrom, requires only a linear movement in one plane and utilizes only a very short path of work. This results in a simple and room-saving structure for the dispensing device. Same can furthermore operate at a high speed, namely it can feed pots in rapid sequence to the conveying mechanism which assures the most economical use of the potting and repotting machine capacity.

To obtain a particularly simple and room-saving structure for the dispensing device, the first holder and the second holder can be arranged one above the other and can be moved in opposite directions by a common control member.

In an advantageous manner, the first and the second holder can have plates with openings and the control member can consist of a pin which extends vertically through both plates and which is connected to a moving mechanism. The construction of both holders as plates have various advantages. They obtain in this manner a large abutting surface which assures a safe contact with the floor pot to be held. Moreover, the edge can be formed corresponding to the shape of the flower pots. For the second holder which must clampingly abut the edge of the next lowest flower pot, a slight curvature inwardly results in an enlarged abutting surface and thus an even distribution of the clamping pressure. Further plates are in a simple manner supported and guided safely with respect to contacting and twisting relative to both their side edges. The construction of both holders as plates permits also the interchangeable use of said plates so that the manufacture and supply of replacement parts is simplified and less expensive. A pin as control member extending through the plates results in a construction of the dispensing device which is both simple and strong.

In one embodiment the two plates are each supported in guides which limit their movement to a horizontal, straight path, the pin is movable horizontally in a direction which is perpendicular to the direction of movement of the plates and the recess of each plate is constructed as a guide slot which is arranged approximately diagonally to both directions of movement, whereby the guide slots of both plates extend at an angle to one another. When the pin moves in one direction, it moves by cooperating with the guide slots one plate perpendicularly to the pin's direction of movement to effect a plate movement away from the stack of pots the other plate simultaneously moving toward the stack of pots. Upon reversal of the direction of movement of the pin, the direction of movement of both plates are also reversed. This arrangement assures that at all times one plate moves into an operable position. This insures against the stack of pots suddenly becoming unsupported and sliding downwardly. The arrangement thus operates without complicated gear arrangements and hence is substantially trouble-free and nonsusceptible to dirt which is unavoidable in a potting and repotting machine. The guide slots can be placed in a simple manner in the plates. The above-mentioned interchangeability of the two plates exists also in this embodiment since upon an exchange of the plates by a rotation at 90° or a tilting of each plate, the guide slots are again in the correct position to one another. During tilting, moreover, a different edge of the plate becomes the abutment edge so that it might be only required to construct each plate with two different edge shapes in order to be able to use them selectively both as a first and also as a second holder.

In a further, preferred embodiment each guide slot has a section which extends diagonally and one which extends perpendicularly to the direction of movement of the plates, whereby the guide slots of both plates in relation to their direction of movement are arranged in mirror-image of one another. The sections which extend perpendicularly to the direction of movement of the plates provide a free path for the pin and will not effect a plate movement. Thus, in this manner, during movement of the pin only the plate moves which has the diagonal section in engagement with the pin. Thus one plate is always in an operative or moving position and in the central position of the pin even both plates are moving. The stack of pots is accordingly continuously supported.

The first and/or the second holder are each associated with a counter holder which is movable simultaneously and in opposite direction. The counter holders can thereby be constructed and controlled in the same manner. The two controls can then be constantly coupled to one another in a simple manner. The stack of pots is thus supported in operative position by the first holder and its counter holder from two sides, and when supported in operative position by the second holder and its counter holder it is clamped between both.

The drive mechanism for the pin or the pins can advantageously have a control slide and a cable line moving said control slide against the force of a return device. This moving mechanism can be constructed in a simple manner both sturdily and with economy of space. Particularly for two pairs of holders which are arranged and movable in opposite direction, such an arrangement is advantageous since the control slide can easily be provided with two arms and thus assures the simultaneous movement. At the same time there is obtained the free space which assures the easy separating of the pots above the conveying mechanism. The cable line permits the movement of the control slide from any desired point of the machine.

Thus in a preferred further development for a potting and repotting machine with a drilling device for a plant hole, the cable line can be operated by said drilling device at one phase of its movement. The drilling device performs in any case during a certain time period in the working cycle of the machine both an up and down movement and a rotating movement. Each of these movements can be used by means of suitable transfer members to operate the cable line for the dispensing device. The return device, for example one or more springs engaging the control slide, then takes care of the corresponding counter movement.

To obtain a good clamping effect, a support construction for a clamping jaw forming the second holder is arranged on the upper plate, said support construction being adjustable both in the direction of movement of the plate and vertically with respect thereto. Such a clamping jaw has a relatively large abutment surface which means a good clamping effect at relatively low unit pressure. The adjusting capability permits it to adjust the dispensing device to any desired pot size. For the same reason the lower plate forming the first holder is cut out angularly at its edge facing the stack of pots. It can thus be used without adjustment for pots of different diameter.

The dispensing device can be constructed in a simple manner adjustably to different pot sizes in such a manner that the guides for the first and second holder are vertically adjustable.

The support device for the stack of pots is advantageously constructed as an angular vertical guide of at least the stack height. It therewith supports the stack of pots at two abutment points. It assures the exact vertical sliding onto the first holder and cooperates clampingly, mounted opposite the dispensing device, with the second holder. The vertical guide can be adjusted in a simple manner to different pot diameters because it is adjustable at different angles.

In order to prevent the danger of high stacks of pots from of tipping, a counter support which leaves free at least two lower pots can be mounted advantageously opposite the vertical guide. For an advantageously simple replenishing of the pot supply, the counter support can be supported on a swivel arm. If a new stack of pots is to be inserted, the path is opened by swinging out of the counter support. It is not necessary to lift a heavy stack of pots and to insert same from above into the support device.

The vertical guide and the counter support can be arranged fixedly on a conveyor track leading past the dispensing device. Such a conveyor track can be constructed as a closed track rotating in a plane, preferably as a turntable. However, a back and forth movable longitudinal track is also possible. Thus a stack of pots can be fed to the support device at an easily accessible point and can thereafter be conveyed to the dispensing device. The conveyor track can in a simple manner be constructed as a supply magazine by arranging thereon several support devices for stacks of pots. If the forward movement of the conveyor track at the distance of two such support devices is controlled automatically by the machine, the refilling of the empty support devices is required only at substantial time intervals. Since the lower edge of the lowermost pot is moved by a conveyor track from the side onto the lower holder of the dispensing device, a slight sloping and, if necessary, a convex curvature of this edge if advantageous. As has been discussed above, such a plate can be advantageously inserted into both holders even if the oppositely positioned edge has an inward curvature inasmuch as both the clamping effect and a tilting continue during exchange.

For an advantageous simplification of the construction of the conveyor track with several support devices a common swivel support for the two associated counter supports can be arranged between two vertical guides each.

In a preferred embodiment the support device has at least three vertical rods which are arranged concentrically to the stack of pots and are adjustable radially to said stack of pots. These rods form a type of a cage for the stack of pots which depending on the pot diameter is variable and assures a safe vertical guide. In order that the friction is kept low during the sliding of the stack of pots, the vertical rods advantageously have a round cross section. The stack of pots and a vertical bar thus contact one another lengthwise only along a vertical line.

The refilling of the support device from several vertical rods is carried out in a simple manner from above for which purpose a rotatable refill magazine is arranged advantageously above the support device. Stacks of pots can be placed on a stationary support surface with an opening above the support device and by rotating a turret head they can be moved so the refill opening.

Exemplary embodiments of the invention are illustrated in the drawings, in which:

FIG. 1 is a schematic and partially sectioned side view of a portion of a potting and repotting machine;

FIG. 2 is a top view of the portion according to FIG. 1;

FIG. 4 illustrates the portion according to FIG. 3 seen approximately from the opposite side;

FIG. 5 is a schematic top view of a dispensing device like in FIGS. 3 and 4; and FIG. 6 is a supplemental detail of this dispensing device.

Figure 3:
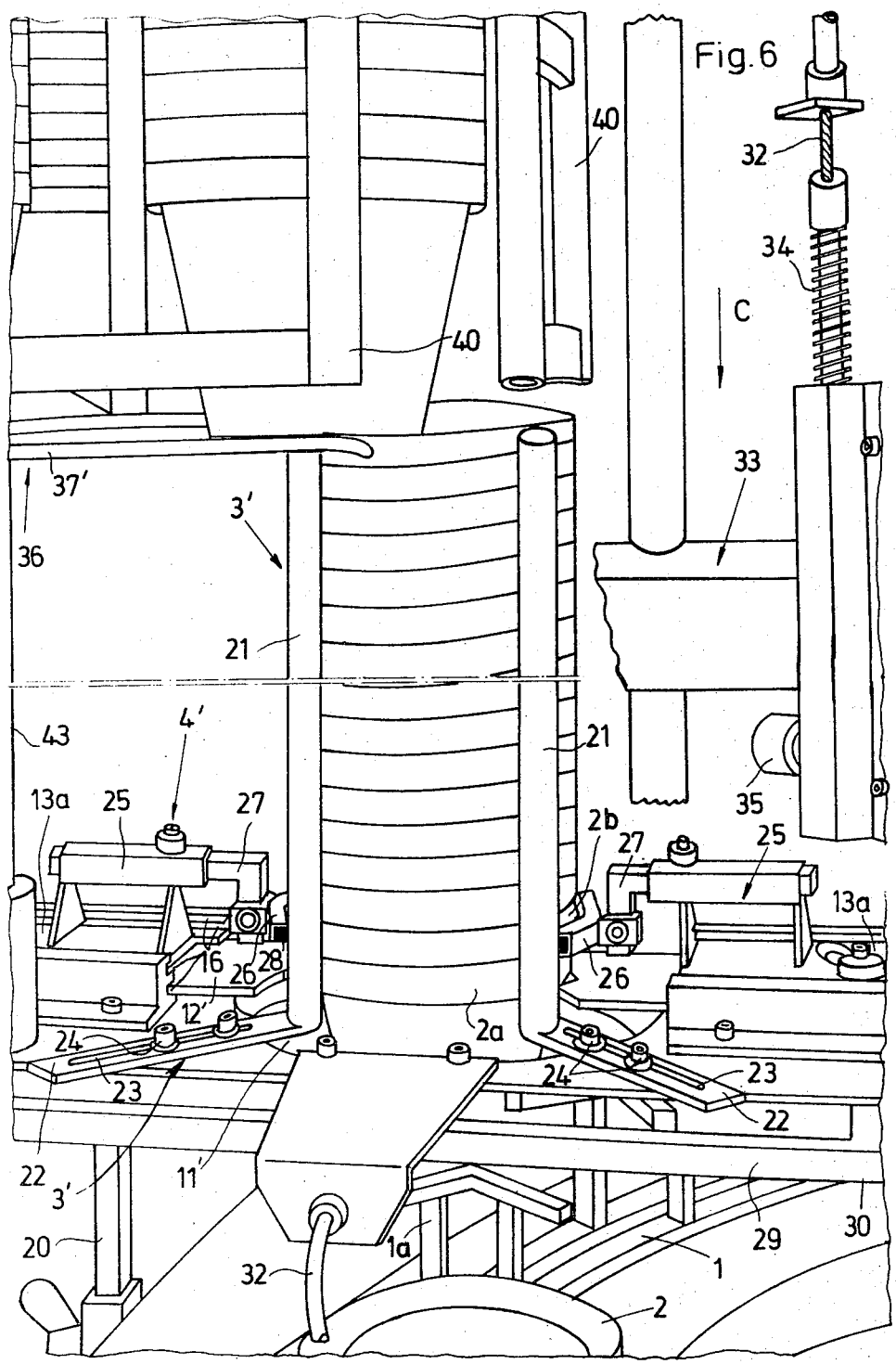
FIG. 3 is a perspective partial view of a further embodiment of a potting and repotting machine, partially broken off.

The figures illustrate only the portion of a potting and repotting machine which is pertinent to the invention, namely a conveying mechanism for flower pots 2 which is only indicated in FIGS. 1 and 2 and a pot-delivery mechanism with a support device 3 for a stack of flower pots and a dispensing device 4. The conveying mechanism 1 can be both a turntable and also a closed or open conveyor track which conducts the individual flower pots to the different stations of the potting and repotting machine. For the purpose of clarity it is not illustrated in FIG. 2.

In the embodiment according to FIGS. 1 and 2, the support device 3 has an angular vertical guide 5, the two surfaces 5a of which are hingedly connected and can be adjusted to one another at different angles in a manner not illustrated. The vertical guide 5 is arranged on a turntable 6 in such a manner that the stack of pots supported by it stands on a working plate 7 which is arranged below the turntable and projects out suitably and is moved on said working plate during rotation of the turntable 6. The vertical guide 5 is associated with a counter support 8 which is arranged also on the turntable 6 rotatably with same by means of a swivel arm 9 and a holder 10. From FIG. 2 one can see that several support devices 3 are arranged spaced apart on the turntable 6, which support devices can be moved one after the other to and away from the dispensing device 4. For each two adjacent vertical guides 5, the associated counter supports 8 are arranged with their swivel arms 9 on a common holder 10. For reasons of clarity the swivel arm 9 which belongs to the support device 3 which is just then provided at the dispensing device 4 is illustrated broken off. In the lower part of FIG. 2, the counter support 8 is swung out in order to permit the insertion of a flower pot stack into the support device 3 which prior thereto has been emptied at the dispensing device.

The working plate 7 has above the conveying mechanism 1 an opening 11. The opening is dimensioned in such a manner that a flower pot can slip through said opening onto the conveying mechanism. In order that not the entire stack but always only one single flower pot falls through the opening 11, the dispensing device 4 is mounted in its vicinity.

The dispensing device 4 has, for holding the stack of flower pots, a first holder 12 and a second holder 13. Each holder is constructed as a plate and has a diagonally arranged elongated guide slot 14 or 15. Both holders are arranged one above the other and are each supported on both sides in U-shaped guide rails 16. The guide rails 16 are in turn arranged adjustably in height in a manner not illustrated on supports 17. The supports 17 are mounted on the working plate 7. The height of the guide rails 16 is thereby adjusted in such a manner that the first holder 12 in its effective position grips under the edge of the respectively lowermost pot 2a of the stack of pots and thus supports the stack. The position is illustrated in the figures. The second holder 13 or rather its guide rails are adjusted in such a manner that it is positioned at equal height with the edge of the next to the lowest pot 2b. When the first holder 12 is in an operative position, as illustrated, the second holder 13 is not engaged with the stack of pots. It is movable into an operative position in its guide rails 16 to clampingly abut the edge of the pot 2b and press said pot against the vertical guide 5. The first holder 12 is thereby simultaneously pulled back so that the lowermost pot 2a can fall through the opening 11 onto the conveying mechanism 1 while the second holder 13 holds the stack of pots. These movements of the two holders are caused and controlled by a pin 18 which extends vertically through the guide slots 14 or 15. Said pin is movable in the directions of the double arrow A by means of a drive (not illustrated) connected through a rod 19, indicated in FIG. 2. The path of movement of said pin 18 extends perpendicularly to the direction of movement of the two holders 12 and 13, which direction of movement is indicated by the double arrow B. When the pin 18 is moved from the one end position illustrated in the figures, which end position corresponds to the operative position of the first holder 12, in direction toward the lower edge of the drawing, the first holder 12 moves away from the stack of pots and the second holder 13 moves toward same. The second holder 13 must thereby already clampingly abut the edge of the next to the lowest pot 2b before the first holder 12 is pulled away from below the edge of the lowermost pot 2a. These fine differences in spacing can, for reasons of clarity, not be illustrated exactly in the drawings.

The plate 12 which forms the first holder has a slightly convex curvature at its front edge facing the stack, while the plate 13 which form the second holder is curved slightly outwardly at its front edge facing the stack. The rear edges of both plates, which are positioned oppositely to the respective front edge the front edges, are constructed oppositely so that each plate after rotating 180° can be used in the other guide as a different holder.

FIGS. 3 to 5 which illustrate a different embodiment of the invention identify elements which are identical to those or perform the same function as those described in FIGS. 1 and 2 with the same reference numerals with a "prime."

Pairs of support elements 1a and 1b are mounted on the conveying mechanism 1 between which one single flower pot is held during further conveying. The working plate 7' is arranged adjustably in height by means of adjusting devices 20 above the conveying mechanism 1. The working plate has an approximately central opening 11' and carries the support device 3' and the dispensing device 4'. The support device 3' has four vertical rods 21 with circular cross section which are each supported on the working plate 7' by means of a horizontal holding bar 22. Each holding bar 22 has a longitudinal slot 23 through which clamping screws 24 extend and which permits an adjustment of the holding bars 22 and thus the vertical rods 21, which adjustment is radial to the stack of pots.

The dispensing device 4' operates in its basic principle just like the dispensing device 4 of the first embodiment. It has a first holder 12' which grips in an operative position under the edge of each respective lowermost flower pot 2a and a second holder 13' which in its operative position clampingly abuts the edge of the next to the lowest pot 2b. Each such holder is associated with a counter holder which is constructed in the same manner and, therefore, provided with the same reference numerals. The counter holder is exactly opposite said holder relatively to the stack of pots and at the same time is movable counterclockwise. The holders 12' and 13' each have a plate whereby both plates are arranged one above the other and are movable in U-shaped guide rails 16 horizontally toward or away from the stack of pots. The lowermost plate is thereby itself the first holder 12'. It has, as can particularly be seen from FIG. 5, an angularly cut-out front edge 12a with which it grips under the edge of the lowermost pot 2a. The upper plate 13a carries a support construction 25 in which a clamping jaw 26 is held both radially to the stack of pots and also adjustably in height. For this purpose the support construction 25 has an angle carrier 27 the horizontal arm of which is longitudinally movable and on the vertical part of which the clamping jaw 26 is held adjustable in height. The clamping jaw 26 has a rubber insert 28 for a protective abutment on the pot edge.

The lower plate 12' has a guide slot 14', the upper plate 13a a guide slot 15'. The guide slots are each constructed angularly with two sections, a section extending diagonally to the direction of movement B of the plates and a section extending perpendicularly to said direction of movement. The slots of both superposed plates are thereby arranged in mirror-image condition relative to the direction of movement B so that their diagonal sections are at an angle to one another and the sections extending perpendicularly to the direction of movement extend in opposite directions. Both guide slots of the superposed plates receive a pin 18' for moving the holders 12' and 13' into their respective operative and inoperative positions. The pin 18' is secured on a rod 19'. The two rods 19' of the holders and counter holders, which are arranged symmetrically to the stack of pots, are connected to form a fork-shaped control slide 30 by means of a transverse bar 29. A pair of return springs 31 each engage the free ends of the rods 19'. One end of a cable line 32 is secured to the center of the transverse bar 29 of the control slide 30. FIG. 6 illustrated schematically indicated, how the other end of the cable line 32 is coupled with a drilling device 33. The drilling device 33 is indicated only through parts of its drill poles and carriage. A pressure spring 34 acts as a return device for the cable line 32. The movement of the drilling device 33 is limited by a stop.

The dispensing of a flower pot from the stack is done in the following manner: The course of movement is started by the drilling device 33 the carriage of which in moving down acts with a pull in direction of the arrow C onto the cable line 32. Under the effect of this pull the control slide 30 moves from its rest position in direction of the arrow D. The rest position is illustrated in FIG. 5. The pins 18' are provided in the center of the guide slots 14' and 15' and the holders 12' and 13' are each in their effective position. In FIG. 5 the holder 13' is left out in the right part of the drawing. By moving the control slide in direction D the pins 18' move in the diagonal part of the guide slots 14' and therewith move the lower plates 12' from their operative position. Through this the lower flower pot 2a is set free and falls onto the conveying mechanism 1. The upper holders 13' are not moved since the pins 18' move in the part of their guide slots, which part is perpendicular to the direction of movement. As soon as the drilling device 33 releases the cable line 32, the return springs 31 effect a movement of the control slide in reverse direction through the rest position. The lower holder 12' is thereby first returned in its operative position. After passing through the rest position the pins 18' move in the part of the lower guide slots 14' which part is perpendicular to the direction of movement of the plates and do not change the operative position. On the contrary they admit the upper holder 13a in the diagonal guide slot part of which they move. The clamping jaws 26 are pulled back from the edge of the flower pot 2b which after falling off of the flower pot 2a is the lowermost pot of the stack so that it can slide after with the stack positioned thereabove onto the lower plate 12'. This section of movement is very short, namely it lasts only until the control slide with the return springs has swung into the rest position, thus through a return movement of the pins 18' in the diagonal parts of the guide slots 15' the clamping jaws 26 abut again in their operative position the now next to the lowest pot. The other end of the cable line 32 is in the meantime because of the return device with the spring 34 also again in the initial position so that the process can be repeated.

To deliver new stacks of pots to the dispensing device 4', a refill magazine 36 (FIGS. 3 and 4) is rotatably arranged above the support device 3'. It has a support rail 37 which can be seen from FIG. 3 for the stacks which is movable thereon by means of a rotatable turret head 38. The turret head 38 has six arms 39 which upon rotation move on the stacks until one is positioned above the support device 3' and there slips downwardly between the vertical bars 21. Co-rotating support elements 40 are mounted on the turret head 38, which support elements are each constructed as a grid of vertical and horizontal bars whereby the vertical bars have a round cross section. These support devices 40 are adjustable radially to the axis of rotation of the turret head in the same manner as the vertical rods 21 for the support device 3' namely by means of holding bars 41 with longitudinal slot and fastening elements. Each support element 40 is associated with two stacks of pots. Furthermore for each stack of pots a nonadjustable counter support 42 is mounted between two arms 39. The refill magazine 36 is supported on the working plate 7' by means of a column 43. The turret head 38 is manually rotatable. However, within the scope of the invention, an automatically controlled refilling process is also possible.

The invention is not limited to the exemplary embodiments. Thus the stacks of pots can particularly be secured at the support device and on the refill magazine in a different manner against tipping. In place of a rotatable refill magazine it it also possible to provide a suitable longitudinal conveying mechanism.

To adjust the dispensing device to the different diameters, the path of movement of the pin or the pins can be constructed variably through which at any time the correct abutment of the holders is assured.

The embodiments of the invention in which an exclusive property or privilege is claimed are as follows:

1. In a potting and repotting machine having a conveying mechanism for flowerpots, said flowerpots having a rim structure adjacent the top projecting radially outwardly therefrom and a sidewardly facing surface thereon, said sidewardly facing surfaces on each of said pots in said stack defining a continuous surface with practically no discernable dividing space between said pots and support means for supporting a vertical stack of said flowerpots, the improvement comprising:

dispensing means secured to said support means adjacent the bottom of said vertical stack and above said pot conveying mechanism and adapted to dispense said flowerpots one at a time onto said pot conveying mechanism, said dispensing means comprising vertically spaced first and second holders and guide means for supporting said first and second holders for reciprocatory movement between positions engaging and spaced from said vertical stack, said first holder consisting of a generally flat, horizontally arranged first plate, one edge of which being adapted to engage, when said first plate is in said engaging position, the bottom-most pot beneath the rim structure thereof to support the weight of said vertical stack and having means defining a first slot therein extending at a first angle to the direction of movement of said first plate, said second holder consisting of a generally flat second plate parallel to said first plate and having engaging means thereon for engaging, when said second plate is in said engaging position, said sidewardly facing surface of said rim structure of the next pot positioned vertically above said bottommost pot in said vertical stack to frictionally engage said next pot positioned vertically above said bottommost pot, said second plate having means defining a second slot therein extending at a second angle to the direction of movement of said second plate, said first slot and said second slot extending at a third angle with respect to each other; and plate actuating means for effecting said reciprocatory movement of said first and second plates, said plate actuating means consisting of pin means received in said first and second slots and supported for reciprocal movement in a first direction transverse to the direction of movement of said first and second plates and transversely to each of said first and second slots and drive means for moving said pin means.

2. The improvement according to claim 1, wherein said first direction is perpendicular to said reciprocatory directions of movement of said first and second plates.

3. The improvement according to claim 1, wherein each of said first and second slots are divided into two sections, one section extending diagonally and one section extending perpendicularly to the direction of movement of said plates, said two sections of the slot in one of said plates being the mirror image to the slot in the other of said plates.

4. The improvement according to claim 1, wherein said drive means for said pin means comprises a control slide and a cable line for moving said control slide against the force of a return device.

5. The improvement according to claim 4 including a drilling device for making a plant hole material contained within said pots; and
wherein said cable line is operated in a phase of movement of the drilling device by said drilling device.

6. The improvement according to claim 1, wherein said engaging means on said second plate comprises a support construction defining a clamping jaw, said clamping jaw being adjustable in direction of movement of said second plate, said support construction further including means for vertically adjusting said clamping jaw.

7. The improvement according to claim 6, wherein said one edge on said first plate is at an angle with respect to the direction of movement of said first plate.

8. The improvement according to claim 1, wherein said guide means for said first and second holders include means for permitting an adjustment thereof in height.

9. The improvement according to claim 1, wherein said support means has an angular vertical guide having a height of at least the stack height.

10. The improvement according to claim 9, wherein said vertical guide is adjustable at different angles.

11. The improvement according to claim 9, wherein said support means includes means defining a counter support opposite the vertical guide, which counter support leaves at least the two lower pots free.

12. The improvement according to claim 11 wherein said counter support is supported on a swivel arm.

13. The improvement according to claim 1, wherein said support means is mounted fixedly on a conveyor track leading past the dispensing device.

14. The improvement according to claim 13, including several support devices for stacks of pots arranged on the conveyor track.

15. The improvement according to claim 13 wherein the conveyor track consists of a turntable.

16. The improvement according to claim 14 including one common swivel support for the two associated counter supports which is arranged between two vertical guides.

17. The improvement according to claim 1, wherein said support means has at least three vertical rods which are arranged concentrically to the stack of pots and are adjustable radially to said stack of pots.

18. The improvement according to claim 17, wherein said vertical rods have a round cross section.

19. The improvement according to claim 1, including a rotatable refill magazine arranged above said support device.

20. The improvement according to claim 1, including a working plate for carrying said guide means, said support device including means for adjusting the height of said guide means above the conveying mechanism for the flower pots.

* * * * *